(12) United States Patent
Lin

(10) Patent No.: US 7,016,189 B2
(45) Date of Patent: Mar. 21, 2006

(54) COMPUTER HARD DISK DAMPER

(76) Inventor: Jen-Cheng Lin, 9 Fl., No. 786, Chung-Cheng Rd., Chung-Ho City, Taipei Hsien (TW)

(*) Notice: Subject to any disclaimer, the term of this patent is extended or adjusted under 35 U.S.C. 154(b) by 176 days.

(21) Appl. No.: 10/702,928

(22) Filed: Nov. 5, 2003

(65) Prior Publication Data

US 2005/0094368 A1 May 5, 2005

(51) Int. Cl.
*H05K 5/00* (2006.01)
*H05K 7/00* (2006.01)
(52) U.S. Cl. .................. 361/685; 248/634; 361/683
(58) Field of Classification Search .......... 24/457–458; 248/633, 634, 636, 638, 618; 369/75.1; 312/223.1, 312/223.2; 361/685, 724–727
See application file for complete search history.

(56) References Cited

U.S. PATENT DOCUMENTS

| | | | | |
|---|---|---|---|---|
| 4,713,714 A * | 12/1987 | Gatti et al. | .................. | 360/137 |
| 5,216,582 A * | 6/1993 | Russell et al. | .............. | 361/685 |
| 5,402,308 A * | 3/1995 | Koyanagi et al. | ........... | 361/685 |
| 5,463,527 A * | 10/1995 | Hager et al. | ................. | 361/685 |
| 5,491,608 A * | 2/1996 | Koyanagi et al. | ........... | 361/685 |
| 5,535,092 A * | 7/1996 | Bang | ........................... | 361/685 |
| 5,654,875 A * | 8/1997 | Lawson | ...................... | 361/685 |
| 5,914,855 A * | 6/1999 | Gustafson et al. | .......... | 361/685 |
| 6,005,768 A * | 12/1999 | Jo | .............................. | 361/685 |
| 6,078,498 A * | 6/2000 | Eckerd et al. | ............... | 361/685 |
| 6,196,516 B1 * | 3/2001 | Lan | ............................. | 248/634 |
| 6,304,440 B1 * | 10/2001 | Lin | ............................. | 361/685 |
| 6,339,532 B1 * | 1/2002 | Boulay et al. | .............. | 361/685 |
| 6,377,450 B1 * | 4/2002 | Gan | ............................ | 361/685 |
| 6,477,042 B1 * | 11/2002 | Allgeyer et al. | ............ | 361/685 |
| 6,487,081 B1 * | 11/2002 | Homer et al. | ............... | 361/730 |
| 6,496,362 B1 * | 12/2002 | Osterhout et al. | .......... | 361/685 |
| 6,717,816 B1 * | 4/2004 | Tanaka et al. | .............. | 361/728 |
| 6,760,219 B1 * | 7/2004 | Hood et al. | ................. | 361/685 |
| 6,837,934 B1 * | 1/2005 | Patrykus | ..................... | 118/500 |
| 6,859,363 B1 * | 2/2005 | Chuang | ...................... | 361/685 |
| 2005/0013110 A1 * | 1/2005 | Shah et al. | ................. | 361/685 |

* cited by examiner

*Primary Examiner*—Lisa Lea-Edmonds
*Assistant Examiner*—Ingrid Wright
(74) *Attorney, Agent, or Firm*—Dellett & Walters

(57) ABSTRACT

A damper adapted to be sandwiched between a computer casing and a hard disk includes multiple pads adapted to be sandwiched between the computer casing and a side face of the hard disk such that impact to the computer casing and transmitted to the hard disk is reduced and thus the hard disk is protected from damage.

3 Claims, 3 Drawing Sheets

COMPUTER HARD DISK DAMPER

BACKGROUND OF THE INVENTION

1. Field of the Invention

The present invention relates to a damper, and more particularly to a damper for a computer hard disk so that when there is an impact to the computer casing, the damper is able to dampen the impact and provide a protection to the hard disk.

2. Description of Related Art

The extraordinary expansion of information technology has resulted in the ubiquitous penetration of our daily lives by computers. Due to the convenience of radio communication, computer users with laptop computers have become increasingly able to communicate and work while mobile. However, it is found that one drawback of computers being used away from the permanence of a workstation is that the laptop etc is exposed to all kinds of impact. Some degree of impact is inevitable however careful a user may be and the impact will probably cause malfunctions to the laptop. In particular, damage to the hard disk may occur and information becoming unretrievable as a result of impact may be a very serious problem. Therefore, manufacturers are trying all sorts of means to prevent the computer from experiencing such damage, yet at present, users must still take great care which is quite troublesome and contrary to the spirit of modern lifestyles.

To overcome the shortcomings, the present invention tends to provide a computer hard disk damper to mitigate the aforementioned problems.

SUMMARY OF THE INVENTION

The primary objective of the present invention is to provide an improved computer hard disk damper to dampen the shock to the computer casing so that the hard disk is protected from impact to the computer casing.

To accomplish the foregoing objective, the damper of the present invention includes two protection boards securely and oppositely connected to a side of the hard disk and multiple rubber pads securely sandwiched between the protection boards and the side of the hard disk so that after the two protection boards are sandwiched between the computer casing, the impact to the computer casing will be dampened by the rubber pads and the hard disk is thus protected from damage.

Other objects, advantages and novel features of the invention will become more apparent from the following detailed description when taken in conjunction with the accompanying drawings.

DETAILED DESCRIPTION OF THE PREFERRED EMBODIMENT

Figure 1:
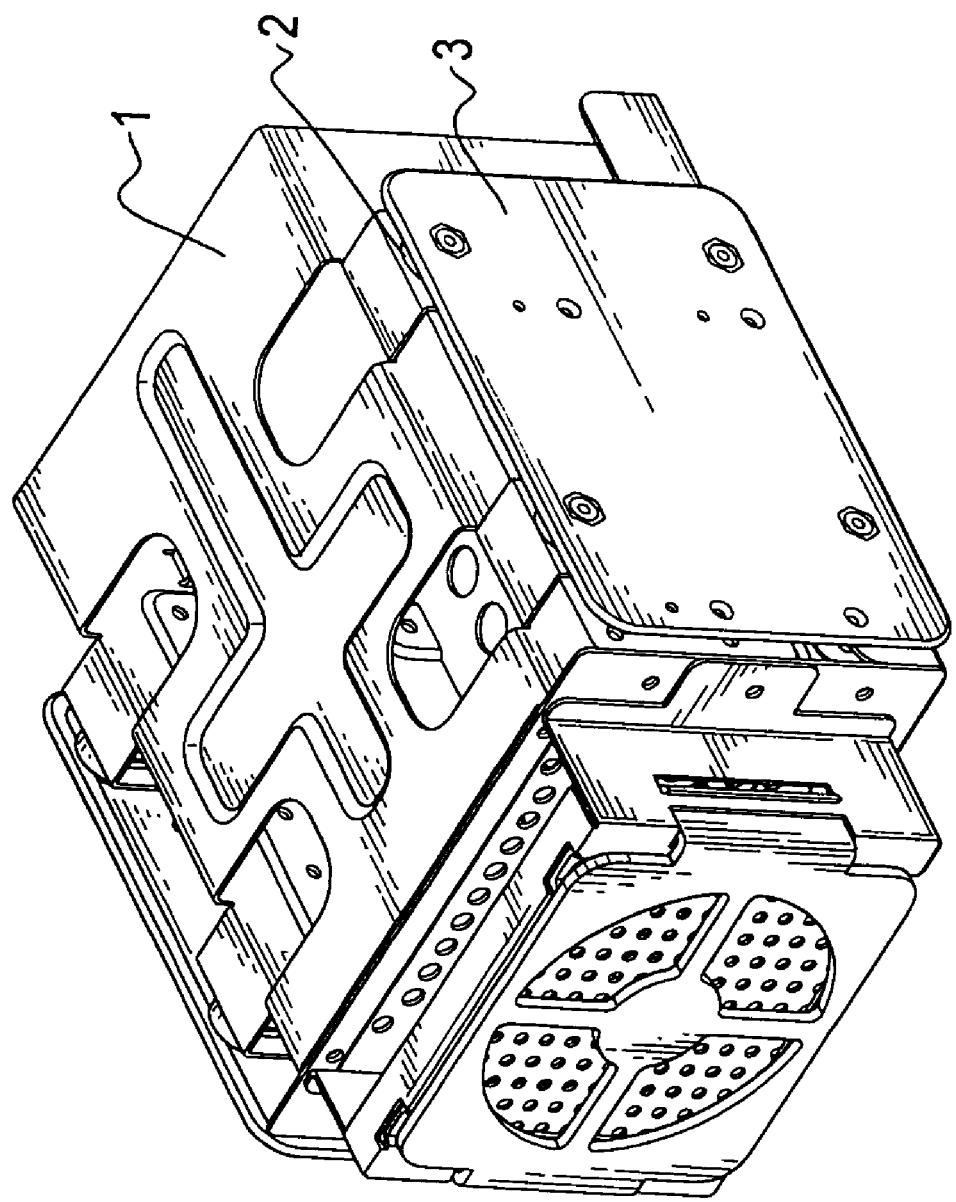
FIG. 1 is perspective view of the damper together with a computer hard disk.
Figure 2:
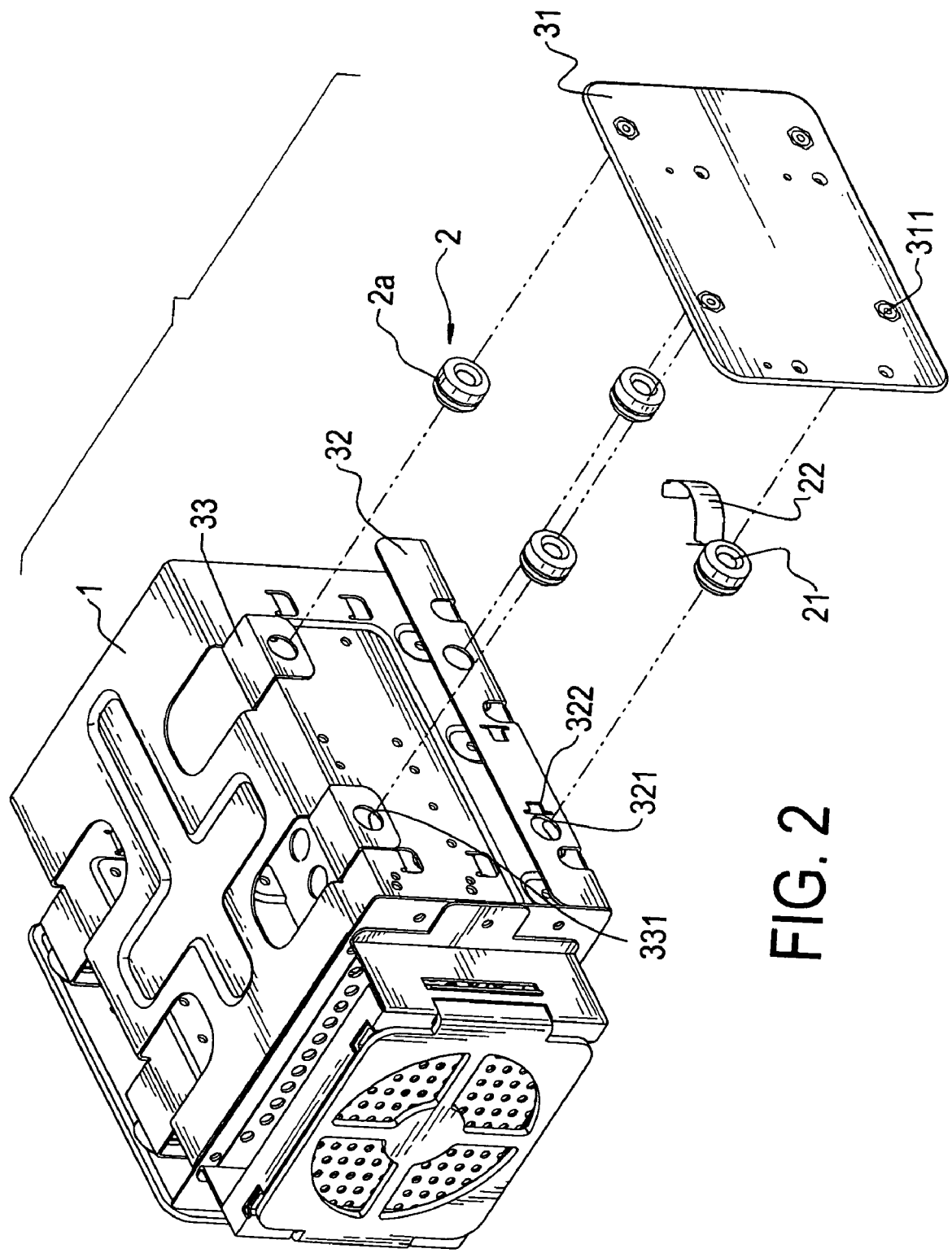
FIG. 2 is an exploded perspective view of the damper of the present invention.

With reference to FIGS. 1 and 2, the damper in accordance with the present invention is adapted to securely engage with a hard disk (1) and includes multiple pads (2) and a protection board (3).

Preferably, the pad (2) is made of a resilient material and presented as a rubber pad (2a). Each rubber pad (2a) has a connection hole (21) defined through the rubber pad (2a). An arcuate contact (22) made of metal is mounted on one of the rubber pads (2a).

The protection board (3) has a connection board (31), a connection plate (32) and two engaging plates (33). The connection board (31) has through holes (311) defined through the connection board (31) to correspond to the connection holes (21) of the rubber pads (2a).

The connection plate (32) has first connection holes (321) defined in the connection plate (32) to correspond to the connection holes (21) of the rubber pads (2a). An engaging hole (322) is defined adjacent to one of the connection holes (321) to correspond to a free end of the contact (22).

Each of the engaging plates (33) has a second connection hole (331) corresponding to the connection holes (21) of the rubber pads (2a).

Figure 3:
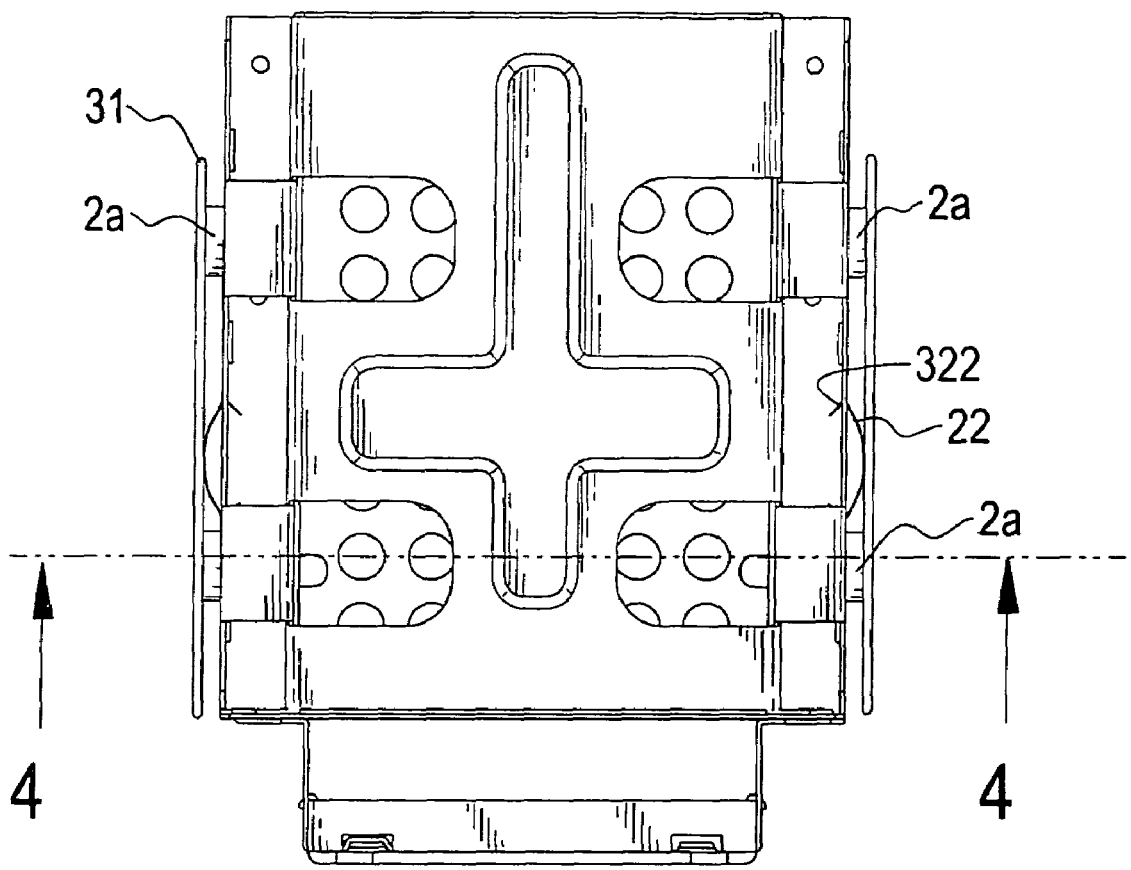
FIG. 3 is a top plan view of the damper in assembly with the hard disk.
Figure 4:
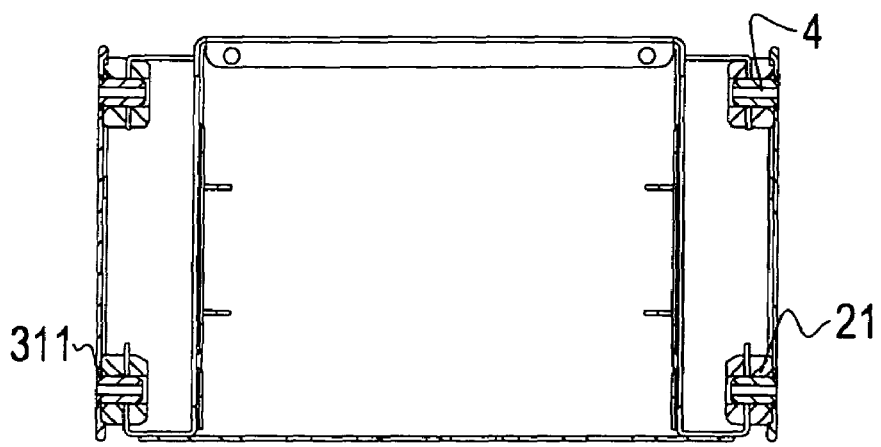
FIG. 4 is a cross sectional view by line 4—4 in FIG. 3.

With reference to FIGS. 3 and 4, when the damper of the present invention is to be assembled with the hard disk (1), the engaging plates (33) and the connection plate (32) are securely engaged with the side face of the hard disk (1). After inserting the rubber pads (2a) into the corresponding first connection holes (322) of the connection plate (32) and the second connection holes (331) of the engaging plates (33), the free end of the contact (22) is inserted into the engaging hole (322) in the connection plate (32).

After the through holes (311) are mated with the connection holes (21) of the rubber pads (2a), a connection screw (4) is applied to each of the through holes (311) to securely engage the connection board (31) with the connection plate (32) and the engaging plates (33), which securely sandwiches the rubber pads (2a) therebetween.

It is to be noted that after the application of the rubber pads (2a) between the computer casing and the side face of the hard disk (1), impact to the computer casing is reduced so that a certain degree of protection to the hard disk (1) is provided by the damper of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A damper adapted to be sandwiched between a computer casing and a hard disk, the damper, comprising:

multiple pads adapted to be sandwiched between the computer casing and a side face of the hard disk such that impact to the computer casing and transmitted to the hard disk is reduced and thus the hard disk is protected from damage, and each pad having a connection hole defined to allow an engaging screw to extend therethrough to securely position the pads between the computer casing and the hard disk;

at least one engaging plate adapted to securely connect to an upper side of the hard disk and provided with a first connection hole defined therethrough to correspond to at least one connection hole of at least one of the pads;

a connection plate adapted to securely engage with a lower side of the hard disk and provided with second connection holes defined therethrough to correspond to the other connection holes of the other pads;

a connection board sandwiching the pads with the at least one engaging plate and the connection plate and provided with through holes corresponding respectively to the connection holes of the pads; wherein:

each pad is a rubber pad, and a metal arcuate contact is provided to one of the rubber pads;

an engaging hole is defined adjacent to one of the second holes of the connection plate to correspond to a free end of the contact such that after the free end of the contact is inserted into the engaging hole, the contact engages the connection board, the at least one engaging plate and the connection plate.

2. A damper adapted between a computer casing and a side face of a hard disk to protect the hard disk from damage resulting from an impact to the computer casing, the damper comprising:

multiple rubber pads each pad adapted to be securely sandwiched between a connection board, an engaging plate and a connection plate; wherein the engaging plate is engaged securely with a top portion of the hard disk, the connection plate is connected to a bottom portion of the hard disk, and each rubber pad has a connection hole for an extension of a connection screw from the connection board and into the connection plate and the engaging plate to secure the rubber pads; and a metal arcuate contact provided to one of the rubber pads for engagement with the connection board and the connection plate.

3. A damper adapted to be sandwiched between a computer casing and a hard disk, the damper comprising:

multiple pads adapted to be sandwiched between the computer casing and a side face of the hard disk such that impact to the computer casing and transmitted to the hard disk is reduced and thus the hard disk is protected from damage; wherein:

each pad is a rubber pad and a metal arcuate contact is provided to one of the rubber pads.

* * * * *